United States Patent [19]

Fischer et al.

[11] 4,280,391
[45] Jul. 28, 1981

[54] ARRANGEMENT FOR ANCHORING A MOUNTING ELEMENT IN A SUPPORT STRUCTURE AND MOUNTING AN OBJECT ON THE SAME

[75] Inventors: Artur Fischer, Weinhalde 34, D-7244 Waldachtal 3, Tumlingen, Fed. Rep. of Germany; Klaus Fischer, Waldachtal, Fed. Rep. of Germany

[73] Assignee: Artur Fischer, Waldachtal, Fed. Rep. of Germany

[21] Appl. No.: 74,407

[22] Filed: Sep. 10, 1979

[30] Foreign Application Priority Data

Oct. 17, 1978 [DE] Fed. Rep. of Germany ....... 2845107
Nov. 29, 1978 [DE] Fed. Rep. of Germany ....... 2851558

[51] Int. Cl.³ ............... F16B 37/04; B65D 79/00; E21D 21/02
[52] U.S. Cl. .................................. 411/15; 206/219; 405/261; 411/82
[58] Field of Search ............... 85/63, 23, 83, 82; 151/41.7, 14.5; 405/260, 261; 206/219, 220; 156/293, 510; 52/704, 743

[56] References Cited

U.S. PATENT DOCUMENTS

| | | | |
|---|---|---|---|
| 2,819,738 | 1/1958 | Marberg | 206/219 X |
| 3,255,872 | 6/1966 | Long et al. | 206/219 |
| 3,294,227 | 12/1966 | Schneider et al. | 206/219 |
| 3,302,410 | 2/1967 | McLean | 405/261 |
| 3,339,716 | 9/1967 | Taylor | 206/219 |
| 3,705,646 | 12/1972 | Jankowski et al. | 206/219 |
| 3,737,027 | 6/1973 | Ball | 405/260 X |
| 4,085,652 | 4/1978 | Vanotti | 85/83 |
| 4,105,114 | 8/1978 | Knox et al. | 405/261 |
| 4,126,005 | 11/1978 | Coursen | 405/261 |
| 4,132,080 | 1/1979 | Hansen | 405/261 |

FOREIGN PATENT DOCUMENTS

| | | | |
|---|---|---|---|
| 2525579 | 12/1976 | Fed. Rep. of Germany | 85/63 |
| 2556493 | 6/1977 | Fed. Rep. of Germany | 405/259 |
| 1575163 | 6/1969 | France | 85/63 |
| 1408366 | 10/1975 | United Kingdom | 405/261 |

*Primary Examiner*—Ramon S. Britts
*Attorney, Agent, or Firm*—Michael J. Striker

[57] ABSTRACT

An arrangement for mounting an object to a support structure has a mounting element insertable into a mounting hole of the support structure, a flexible container arranged to accommodate an adhesive substance and to be inserted into the mounting hole prior to the mounting element, and an abutment member arranged to abut against an outer face of the support structure and provided with the slot. When the flexible container inserted in the mounting hole is pulled out from the latter and through the slot of the abutment member the adhesive substance is squeezed from the container into the mounting hole so as to anchor the mounting element insertable into the hole.

20 Claims, 8 Drawing Figures

ARRANGEMENT FOR ANCHORING A MOUNTING ELEMENT IN A SUPPORT STRUCTURE AND MOUNTING AN OBJECT ON THE SAME

BACKGROUND OF THE INVENTION

The present invention relates to anchoring of a mounting element in a support structure, such as a concrete structure, by insertion of the mounting element into a mounting hole of the structure and filling the hole by an adhesive substance. The thus-anchored mounting element is utilized for mounting an object to the support structure.

An adhesive anchor is known, which has a cartridge of glass in which both components of an adhesive substance are accommodated. In order to separate both components, one of the components is contained in a smaller glass cartridge. Both the material and the closing of the cartridge make the known adhesive anchor very expensive. Moreover, the utilization of the readily breakable glass cartridges encounters difficulties in their packaging and application. Finally, the glass cartridges must be smashed and crushed in the mounting hole into the smallest possible particles. This requires to take precautions for the mounting element, on the one hand, and to provide for a relatively large slot between the mounting element and the hole wall for receiving an additional filling material, on the other hand.

SUMMARY OF THE INVENTION

Accordingly, it is an object of the present invention to provide an arrangement in which the disadvantages of the prior art are eliminated.

In keeping with this object and with others which will become apparent hereinafter, one feature of the present invention resides, briefly stated, in an arrangement which has a flexible container adapted to accommodate an adhesive substance and having inlet closure means separable from the container, and an abutment member adapted to abut against an outer face of a support structure and provided with a slot having a dimension corresponding to the thickness of the flexible container in emptied and folded state, so that when the flexible container filled by the adhesive substance and located in a mounting hole is pulled out of the latter through the slot of the abutment member, the adhesive substance is squeezed from the flexible container into the mounting hole, for anchoring a mounting element which is thereafter inserted into the hole.

The mounting hole is first produced in the support structure, the hole having a diameter which is greater than the outer diameter of the mounting element to facilitate insertion of the latter. After the separation of the inlet closure from the flexible container which is formed for example as a foil tubular element, the latter is inserted into the mounting hole, until the abutment member, which is formed as a disc fitted on a rear strip-shaped end portion of the flexible container, abuts against the outer face of the support structure. By pulling of the foil tubular element through the slot of the disc, the adhesive substance is pressed out of the foil tubular element, so that filling of the mounting hole from the hole bottom in the direction of the hole inlet is attained. Thereby, neither during the filling of the adhesive substance, nor during the insertion of the mounting element ventilating problems take place, inasmuch the mounting hole inlet is not closed by the adhesive substance.

When the mounting element is inserted into the mounting hole, the adhesive substance fills a gap between the mounting hole wall and the outer surface of the mounting element, up to the inlet of the mounting hole. The mounting element may be formed as a threaded pin, since the thread located in the mounting hole provides for a very effective arresting action. The arresting action may also be attained by other forms of roughening of the portion of the mounting element, the portion being located in the mounting hole. For example, this portion of the mounting element may be provided with knurles or grooves. After hardening of the adhesive substance, an object can be mounted on the support structure by screwing of a nut onto an outer thread of the mounting element.

The packaging of the adhesive substance in a foil tubular element does not encounter any problems, since the latter can be easily closed by thermal welding. Moreover, the foil tube is not brittle and thereby its handling and application are very practical. Furthermore, it is no longer necessary to smash and crush the package in the mounting hole.

In accordance with another feature of the present invention, when the adhesive substance is multi-component, the flexible container may have a plurality of chambers whose number corresponds to the number of the components and which extend in the direction of elongation of the container up to the inlet closure. The subdivision of the interior of the foil tube into the separate chambers is easily performed by welding seams. Since all chambers extend up to the inlet closure, all chambers are simultaneously opened after separation of the inlet closure and simultaneously emptied by pulling of the foil tube through the slot of the disc.

In accordance with stil another feature of the present invention, the volumes of the chambers correspond to the volumes of the components to be mixed with each other. In connection with the above-mentioned objects, this construction ensures that the components of the adhesive substance, during the simultaneously emptying step, will be supplied one into the other and mixed with one another in proper quantities so as to produce a mixture of a required concentration.

The inner surface of the foil tube may be coated by a material which is resistant to the adhesive substance. When the foil tube is constituted of polyethelene, it is not resistant to some resins which can be utilized as the adhesive substances. When such resins are utilized, the inner surface of the foil tube is coated by resistant materials such as aluminum.

In accordance with a further embodiment of the present invention, the foil tube may be provided with a plurality of perforations in the region of the inlet closure so that the latter can be easily broken off or ripped off from the remainder portion of the foil tube. In such a construction, auxiliary tools, such as a cutter, pliers and the like for separation of the inlet closure are not needed.

A further feature of the present invention is that the mounting element may be inserted into and rotated in the mounting hole for mixing and uniformly distributing the adhesive substance, by means of a receiving element which transmits torque from a drilling machine to the mounting element. The receiving element may have a portion provided with a receiving hole which has a reducing cross section and clampingly receives a trailing end portion of the mounting element. When the adhesive substance is composed of several components, it is advisable to mix them inside of the mounting hole, which can be performed by the mounting element. The utilization of the receiving element results in that the mounting element must not be clamped in a drill chuck. On the other hand, after reaching a required insertion depth and mixing of the components, the connection between the receiving element and the mounting element can be interrupted by pulling out of the receiving element from the mounting element.

In accordance with still a further feature of the present invention, the receiving member may have a portion which is opposite to the mounting element and is provided with a further hole for insertion of a drilling tool utilizable for production of the mounting hole. Means are further provided for transmitting torque from the drilling tool to the receiving element. These means may include two opposite longitudinally extending slots in a wall bounding the further hole of the receiving number, and drilling lamellas provided on the drilling tool and engageable in the above-mentioned slots. In such a construction, it is not necessary to clamp the receiving element in a drill chuck which is very time-economical during serial mounting, inasmuch as the drilling tool for production of the mounting hole must not be extracted from the drill chuck.

In accordance with an additional feature of the present invention, the mounting element may be formed as a dowel sleeve with a closed leading end and provided with an inner threaded or ribbed hole for screwing in of a mounting screw. The dowel sleeve further has outer ribs whose outer dimension substantially corresponds to the diameter of the mounting hole. At least some of the outer ribs are inclined to the longitudinal direction of the dowel sleeve.

In order to anchor the dowel sleeve, the foil tube filled by the adhesive substance is pressed into the mounting hole which is produced with a dimension allowing the insertion of the dowel sleeve. The mixing of the components is performed by the dowel sleeve which is inserted into the mounting hole and rotated in the latter. The outer ribs of the dowel sleeve perform inner mixing of the components of the adhesive substance which is hardened in short time and anchor the dowel sleeve in the mounting hole. Since the dowel sleeve is closed at its leading end, the inner hole of the dowel sleeve remains free of the adhesive substance for subsequent screwing of the mounting screw into the inner hole. In order to make possible screwing in of the mounting screw provided with a wood thread, it is advisable that the dowel sleeve be constituted of a synthetic plastic material and its inner hole be provided with longitudinally extending inner ribs.

Still an additional feature of the present invention is that one half of the inclined outer ribs may be inclined to the right, whereas the other half of the inclined outer ribs may be inclined to the left. Such a construction ensures very effective mixing of the adhesive substance, on the one hand, and very effective arresting action of the dowel sleeve against pulling forces after hardening of the adhesive substance, on the other hand. The opposite inclinations of the ribs also prevent back flow of the adhesive substance out of the mounting hole during the mixing process.

Finally, another feature of the present invention is that a receiving element is provided which has one portion form-lockingly engagable in the inner hole of the dowel sleeve, and another portion connectable with a drilling tool utilizable for production of the mounting hole, the other portion being connectable with the drilling tool with the aid of means for transmitting torque from the latter to the former. When such a receiving element is utilized, the dowel sleeve must not be clamped in a drill chuck. On the other hand, when a required insertion depth and mixing of the components are attained, the connection between the receiving element and the dowel sleeve can be interrupted by pulling out of the sleeve portion received in the receiving element.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
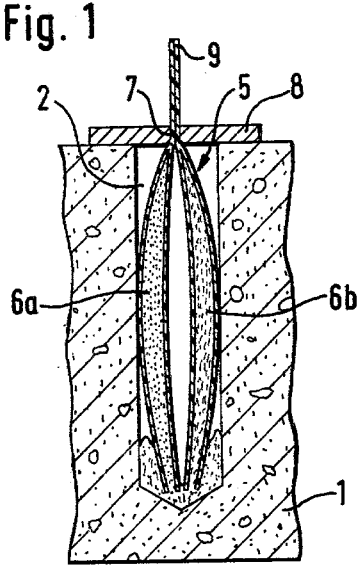
FIG. 1 is a view showing a two-chamber foil tube inserted in a mounting hole of a support structure and provided with a disc.
Figure 2:
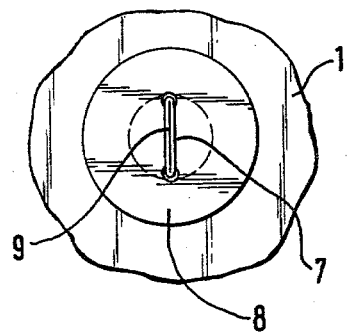
FIG. 2 is a plan view of the disc for emptying of the foil tube.

In order to perform anchoring in accordance with the present invention, a mounting hole 2 is first produced in a supporting element 1. The hole 2 has a diameter which somewhat exceeds the outer diameter of mounting elements 3 and 3' to be inserted into the hole. An inlet closure 4 of a foil tubular element or container 5 is separated from the remainder portion of the latter, and the foil tubular element 5 is inserted into the hole 2. The foil tubular element 5 contains an adhesive substance, such as cement, glue or the like.

As shown in FIG. 1, the foil tubular element 5 has two chambers 6a and 6b for accommodation of two components of a two-component adhesive substance, for example, epoxy resin. In order to press the adhesive substance out of the foil tubular element 5, the latter is pulled through a throughgoing slot 7 of a disc 8. The through-going slot 7 has a dimension corresponding to the thickness of the empty and flatly compressed (folded) foil tubular element 5. For improved handling, an end portion 9 of the foil tubular element 5 is welded together in a web-like manner. In order to attain a uniform emptying of the chamber 6a and 6b of the foil tubular element, the chambers are arranged in the longitudinal direction. When different doses of components are to be supplied, the chambers have volumes corresponding to the required doses. Thereby, a mixture with the required concentration of the components is produced by emptying of both chambers of the foil tubular elements 5.

Figure 3:
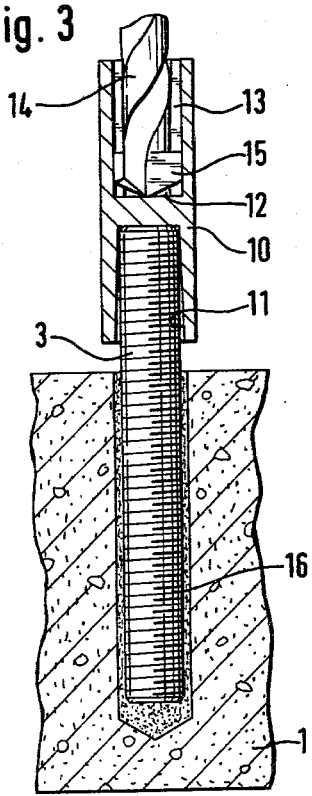
FIG. 3 is a view showing a mounting element with a receiving element in which a drilling tool for production of the mounting hole engages.

In order to inwardly mix the components of the adhesive substance, a mounting element 3 formed as a threaded pin is utilized, as shown in FIG. 3. A receiving element 10 serves for transmission of torque from a drilling or boring machine to the mounting element 3. The receiving element 10 has a receiving hole 11 which has a somewhat reducing cross section and by which the receiving element 10 is clampingly fitted onto one end portion of the mounting element 3, the end portion being opposite to a leading end portion of the same.

The receiving element 10 has an end portion which is opposite to the receiving hole 11 and also provided with a hole 12. The hole 12 has two oppositely located longitudinally extending slots 13. Drilling lamellas 15 which overlap a drill shaft 14 at both sides thereof, engage in the slots 13 and thereby form torque-transmitting connection between the drilling machine and the receiving element 10.

Figure 4:
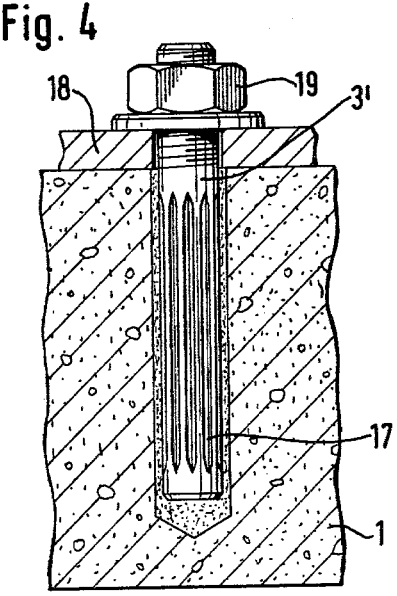
FIG. 4 is a view showing mounting an object to the support structure after anchoring of the mounting element provided with longitudinal notches.

Inner mixing of the components of the adhesive substance is performed by a thread 16 of the mounting element 3 of FIG. 3, or by longitudinal notches 17 of a mounting element 3' shown in FIG. 4. When the mounting element is pressed into the hole 2, the adhesive substance is pressed from the bottom of the hole in the direction of the hole inlet, so that a complete filling of the interior of the hole between the hole wall and the outer wall of the mounting element is attained. When the mounting element reaches the required depth, the receiving element 10 is removed from the mounting element. After hardening of the adhesive substance, an object 18 is mounted on the supporting element 1 by screwing of a nut 19 onto the outer thread of the mounting element.

Figure 5:
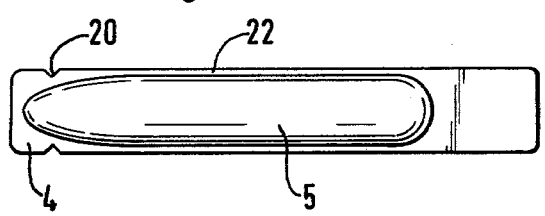
FIG. 5 is a view showing the foil tube with a member for closing an inlet of the former.
Figure 6:
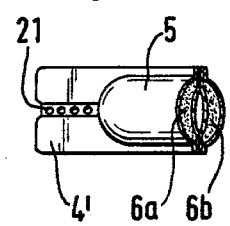
FIG. 6 is a view showing the closing member in accordance with a further embodiment of the present invention.

The inlet closure 4 of the foil tubular element 5 has a mark 20, as shown in FIG. 5. The inlet closure 4 is separated from the remainder portion of the tubular element 5, for example by a cutter or pliers, at the location of the mark 20, before insertion into the hole 2. Another inlet closure 4' shown in FIG. 6 is provided with a plurality of perforation 21 extending in the longitudinal direction. The formation of the chambers 6a and 6b and of their closure is performed by a weld seam 22 produced by a thermal welding process. When styrol-containing resins are utilized, it is necessary to coat the inner wall of the foil tubular element of polyethelene by a material which is resistant to these resins, such as aluminum.

Figure 7:
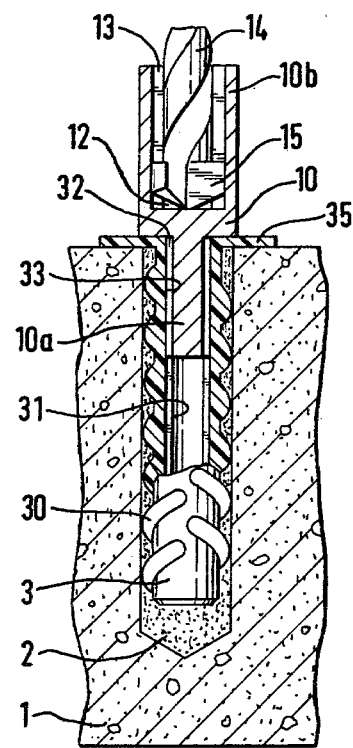
FIG. 7 is a view showing a dowel sleeve with a fitted-on receiving element in which a drilling tool for production of the mounting hole engages.
Figure 8:
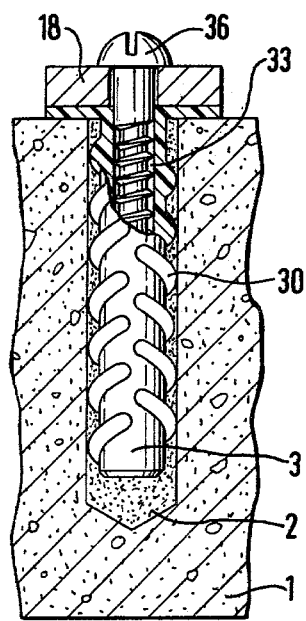
FIG. 8 is a view showing mounting of the object with the aid of the dowel sleeve.

When it is required to anchor the mounting element 3 formed as a dowel sleeve, as shown in FIGS. 7 and 8, the mounting hole 2 is produced in the masonry 1, the hole having a diameter substantially corresponding to the outer dimension of ribs 30 of the dowel sleeve 3 to be anchored. When the components fill the hole, they are mixed in the latter by the dowel sleeve 3 to be anchored. The receiving element 10 serves for transmission of torque from the drilling machine to the dowel sleeve. The receiving element 10 has a portion 10a which is engaged in an inner hole 31 of the dowel sleeve 3. In order to entrain the dowel sleeve 3, the portion 10a has recesses 32 in which inner ribs 33 formed in the hole 31 of the dowel sleeve 3 can engage. The receiving element 10 has another portion 10b provided with the hole 12 having two oppositely located longitudinally extending slots 13. The drill shaft 14 provided at both sides with the drilling lamellas 15 engages in the slots 13 and thereby forms a torque-transmitting connection between the drilling machine and the receiving element 10.

The ribs 30 of the dowel sleeve 3 are inclined to the longitudinal direction or axis of the latter. Thereby, the drillings are displaced from the hole wall, on the one hand, and the components of the adhesive substance are reliably mixed with one another, on the other hand. Simultaneously, when the dowel sleeve 3 is pressed into the hole 2, the adhesive substance is pressed from the hole bottom in the direction toward the hole inlet, so that complete filling of the interior of the hole attained between the hole wall and the outer wall of the dowel sleeve 3 closed at its inlet end. The inclined ribs 30 are oppositely oriented, and thereby backflow of the glueing medium out of the mounting hole is prevented.

The inclined ribs 30 may have at its end a runout or chamfer, for increasing of the arresting action, the runout or chamfer extending transverse to the direction of elongation of the dowel sleeve. Furthermore, the dowel sleeve may have a flange 35 provided for limiting of the insertion, on the one hand, and for sealing of the mounting hole 2, on the other hand.

After mixing of the components of the adhesive substance, the receiving element 10 is removed or pulled from the dowel sleeve and thereby the torque-transmitting connection between the drilling machine and the dowel sleeve is interrupted. After hardening of the adhesive substance, a mounting screw 36 having a wood screw thread is screwed into the hole 31 provided with the longitudinal inner ribs 33 and thereby mounts the object 18 to the masonry 1.

It will be understood that each of the elements described above, or two or more together, may also find a useful application in other types of constructions differing from the types described above.

While the invention has been illustrated and described as embodied in an arrangement for anchoring a mounting element and mounting an object on the latter, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is calimed as new and desired to be protected by Letters Patent is set forth in the appended claims:

1. An arrangement for mounting an object to a support structure having a mounting hole and an outer face, comprising
   a mounting element arranged to be inserted into and anchored in a mounting hole of a support structure and to support an object;
   a flexible container accommodating an adhesive substance and arranged to be inserted into a mounting hole of a support structure prior to said mounting element for emptying into the mounting hole and to be subsequently withdrawn from the mounting hole, said flexible container having an inlet and inlet closure means separable from the remainder portion of said flexible container before insertion of the latter into the mounting hole so as to open said flexible container; and means for emptying said flexible container in the mounting hole, said emptying means including a disc member arranged to abut against an outer face of the support structure so as to close the mounting hole and having a peripherally closed slot whose dimension corresponds to the thickness of said flexible container in emptied and folded conditions, so that when said disc abuts against the outer face of the support structure and said flexible container filled by the adhesive substance is pulled out from the mounting hole through said slot of said disc member, the mounting hole is sealed by said disc member and the adhesive substance accommodated in said flexible container is squeezed out from the latter into the mounting hole, so as to anchor said mounting element after its insertion in the mounting hole.

2. An arrangement as defined in claim 1, wherein said inlet closure is arranged to be broken off from said remainder portion of said flexible container.

3. An arrangement as defined in claim 1, wherein said inlet closure is arranged to be ripped off from said remainder portion of said flexible container.

4. An arrangement as defined in claim 1, wherein said flexible container is a foil tubular element.

5. An arrangement as defined in claim 1, wherein said adhesive substance is a multi component adhesive substance, said flexible container being elongated and having a plurality of chambers whose number corresponds to the number of components of the multi-component substance, said chambers extending in the direction of elongation of said flexible container up to said inlet closure.

6. An arrangement as defined in claim 5, wherein each of the components of the multi-component substance is to be with a predetermined volume, each of said chambers of said flexible container having a volume corresponding to the volume of a respective one of the components.

7. An arrangement as defined in claim 1, wherein said flexible container has an inner surface which is coated by a material which is resistant to the adhesive substance.

8. An arrangement as defined in claim 1, wherein said flexible container has a plurality of perforations in the region of said inlet closure so as to facilitate separation of the latter from the remainder portion of said flexible container.

9. An arrangement as defined in claim 1, and further comprising means for inserting said mounting element into and rotating the same in the mounting hole after filling the latter by the adhesive substance so as to uniformly mix the adhesive substance by said mounting element, said inserting and rotating means including a receiving element arranged to transmit torque from a drilling machine to said mounting element.

10. An arrangement as defined in claim 10, wherein said mounting element has a leading end portion and a trailing end portion as considered in the direction of insertion, said receiving element being provided with a receiving hole having a reducing cross section and arranged to receive said trailing end portion of said mounting element.

11. An arrangement as defined in claim 10, particularly in the mounting hole produced by a drilling tool, wherein said receiving element has a leading and section in which said receiving hole is provided and a trailing end section opposite to said leading end section thereof, said trailing end section of said receiving element having a further hole for receiving the drilling tool; and further comprising means for transmitting torque from the drilling tool to said trailing end section of said receiving element.

12. An arrangement as defined in claim 11, wherein the drilling tool has drilling lamellas, said receiving element being elongated, said further hole for receiving the drilling tool being bounded by a wall having two oppositely located slots which extend in the direction of elongation of said receiving element and arranged so that the drilling lamellas can engage in said oppositely located slots so as to form together with the latter said means for transmitting torque from the drilling tool to said trailing end section of said receiving element.

13. An arrangement as defined in claim 1, wherein said mounting element is a dowel sleeve having a closed leading end and an inner hole provided with inner formation for screwing of a mounting screw into said inner hole, said dowel sleeve having outer formation with an outer dimension substantially corresponding to the diameter of the mounting hole.

14. An arrangement as defined in claim 13, wherein said inner formation is an inner thread.

15. An arrangement as defined in claim 13, wherein said dowel sleeve has a longitudinal axis, said inner formation being longitudinally extending inner ribs.

16. An arrangement as defined in claim 13, wherein said outer formation is outer ribs.

17. An arrangement as defined in claim 16, wherein said dowel sleeve has a longitudinal axis, at least some of said outer ribs being inclined to said longitudinal axis of said dowel sleeve.

18. An arrangement as defined in claim 17, wherein one half of said inclined outer ribs are inclined to the right, whereas the other half of said inclined outer ribs are inclined to the left.

19. An arrangement as defined in claim 13, particularly in the mounting hole produced by a drilling tool drivable from a drilling machine, and further comprising an elongated receiving element having two end sections spaced from one another in the direction of elongation, one of said end sections of said receiving element being form-lockingly engageable in said dowel sleeve, the other of said end sections of said receiving element being arranged to receive the drilling tool so as to transmit torque from the latter to said receiving element and thereby to said dowel sleeve so that the latter can be inserted into and rotated in the mounting hole to thereby mix and uniformly distributed the adhesive substance in the mounting hole.

20. An arrangement for anchoring a mounting element in a mounting hole of a support structure having an outer face, with the use of an adhesive substance, the arrangement comprising a flexible container arranged for accommodating an adhesive substance and arranged to be inserted into a mounting hole of a support structure for emptying into the mounting hole and to be subsequently withdrawn from the mounting hole prior to said mounting element, said flexible container having an inlet and inlet closure means separable from the remainder portion of said flexible container before insertion of the latter into the mounting hole; and means for emptying said flexible container into the mounting hole, said emptying means including a disc member arranged to abut against an outer face of the support structure so as to close the mounting hole and having a peripherally closed slot whose dimension corresponds to the thickness of said flexible container in emptied and folded conditions, so that when said disc abuts against the outer face of the support structure and said flexible container filled by the adhesive substance is pulled out from the mounting hole through said slot of said disc member, the mounting hole is sealed by said disc member and the adhesive substance accommodated in said flexible container is squeezed out from the latter into the mounting hole so as to anchor a mounting element.

* * * * *